(12) United States Patent
Thomson et al.

(10) Patent No.: US 12,339,493 B2
(45) Date of Patent: Jun. 24, 2025

(54) PHOTONIC CHIP AND METHOD OF MANUFACTURE

(71) Applicant: UNIVERSITY OF SOUTHAMPTON, Hampshire (GB)

(72) Inventors: David Thomson, Southampton (GB); Graham Reed, Southampton (GB); Wei Wei Zhang, Southampton (GB); Martin Ebert, Southampton (GB)

(73) Assignee: University of Southampton, Hampshire (GB)

( * ) Notice: Subject to any disclaimer, the term of this patent is extended or adjusted under 35 U.S.C. 154(b) by 498 days.

(21) Appl. No.: 17/605,500

(22) PCT Filed: Apr. 24, 2020

(86) PCT No.: PCT/EP2020/061483
§ 371 (c)(1),
(2) Date: Oct. 21, 2021

(87) PCT Pub. No.: WO2020/216917
PCT Pub. Date: Oct. 29, 2020

(65) Prior Publication Data
US 2022/0214498 A1    Jul. 7, 2022

(30) Foreign Application Priority Data
Apr. 24, 2019   (GB) ..................... 1905698

(51) Int. Cl.
*G02B 6/12*        (2006.01)
*G02B 6/122*       (2006.01)
(Continued)

(52) U.S. Cl.
CPC .......... *G02B 6/1228* (2013.01); *G02B 6/131* (2013.01); *G02B 6/132* (2013.01); *G02B 6/136* (2013.01); *G02B 2006/12176* (2013.01)

(58) Field of Classification Search
CPC ...... G02B 6/1228; G02B 6/131; G02B 6/132; G02B 6/136; G02B 2006/12176
See application file for complete search history.

(56) References Cited

U.S. PATENT DOCUMENTS 6,058,233 A * 5/2000 Dragone ............... G02B 6/132
385/20
6,293,688 B1 * 9/2001 Deacon ................... G02B 6/42
362/556
(Continued)

FOREIGN PATENT DOCUMENTS

WO   WO-2011-019887 A2   2/2011

OTHER PUBLICATIONS

H. Yanagawa, T. Shimizu, S. Nakamura and I. Ohyama, "Index-and-dimensional taper and its application to photonic devices," in Journal of Lightwave Technology, vol. 10, No. 5, pp. 587-592, May 1992, doi: 10.1109/50.136092. (Year: 1992).*
(Continued)

*Primary Examiner* — Peter Radkowski
(74) *Attorney, Agent, or Firm* — Quarles & Brady LLP (57) ABSTRACT

The invention provides a photonic chip comprising: a silicon substrate, an low refractive index layer above the silicon substrate, and a tapered waveguide above the low refractive index layer, the tapered waveguide having a first height at a first end of the tapered waveguide and a second height at a second end of the tapered waveguide, the second height being greater than the first height, and the tapered waveguide having a bottom surface that is closer to the substrate at the second end than at the first end. The invention further provides a method of manufacturing a photonic chip, the method comprising: providing a wafer comprising a silicon substrate, and an low refractive index layer above the silicon substrate, etching the low refractive index layer to form a tapered trench having a first height at a first end of the
(Continued)

tapered trench and a second height at a second end of the tapered trench, the first second height being greater than the second first height, and the tapered trench having a bottom surface that is closer to the substrate at the first second end than at the second first end, and forming a tapered waveguide in the tapered trench.

25 Claims, 5 Drawing Sheets

(51) Int. Cl.
*G02B 6/13* (2006.01)
*G02B 6/132* (2006.01)
*G02B 6/136* (2006.01)

(56) References Cited

U.S. PATENT DOCUMENTS

| | | | |
|---|---|---|---|
| 6,768,855 B1* | 7/2004 | Bakke | G02B 6/1228 385/129 |
| 6,884,327 B2* | 4/2005 | Pan | C23C 14/044 427/259 |
| 6,980,720 B2* | 12/2005 | Gothoskar | G02B 6/1228 385/33 |
| 7,005,247 B1* | 2/2006 | Fong | G02B 6/12011 430/323 |
| 8,045,832 B2* | 10/2011 | Pan | G02B 6/1228 385/43 |
| 8,170,383 B2* | 5/2012 | Tokushima | G02B 6/136 385/28 |
| 8,472,766 B2* | 6/2013 | Spector | G02B 6/1228 438/31 |
| 8,483,528 B2* | 7/2013 | Socci | G02B 6/1228 385/28 |
| 9,076,902 B2 | 7/2015 | Lui | |
| 9,323,079 B1* | 4/2016 | Feng | G02B 6/14 |
| 9,366,816 B2* | 6/2016 | Demaray | G02B 6/122 |
| 9,563,014 B2* | 2/2017 | Pan | G02B 6/1228 |
| 9,759,864 B2* | 9/2017 | Painchaud | G02B 6/00 |
| 9,798,082 B2* | 10/2017 | Demaray | C23C 14/083 |
| 9,958,607 B2* | 5/2018 | Yanagisawa | G02B 6/132 |
| 9,989,701 B2* | 6/2018 | Demaray | G02B 6/4212 |
| 10,120,130 B2* | 11/2018 | Demaray | G02B 6/1228 |
| 10,197,734 B2* | 2/2019 | Painchaud | G02B 6/1228 |
| 10,514,509 B2* | 12/2019 | Popovic | G02B 6/34 |
| 2002/0191916 A1* | 12/2002 | Frish | G02B 6/3566 385/39 |
| 2003/0108319 A1* | 6/2003 | Chong | G02B 6/10 385/129 |
| 2003/0118310 A1* | 6/2003 | Steinberg | G02B 6/1228 385/132 |
| 2003/0173208 A1* | 9/2003 | Pan | G02B 6/132 427/163.2 |
| 2005/0105853 A1* | 5/2005 | Liu | G02B 6/1228 385/39 |
| 2005/0175287 A1* | 8/2005 | Pan | C23C 14/044 385/28 |
| 2005/0183946 A1* | 8/2005 | Pan | G02B 6/1228 204/192.15 |
| 2010/0067846 A1* | 3/2010 | Tokushima | G02B 6/136 264/1.24 |
| 2011/0026880 A1* | 2/2011 | Galli | G02B 6/1228 385/28 |
| 2011/0156183 A1* | 6/2011 | Liu | G02B 6/4215 257/E31.127 |
| 2011/0170825 A1* | 7/2011 | Spector | G02B 6/136 438/31 |
| 2014/0140659 A1* | 5/2014 | Demaray | G02B 6/1228 385/28 |
| 2014/0193115 A1* | 7/2014 | Popovic | G02B 6/124 385/14 |
| 2015/0086153 A1 | 3/2015 | Ono et al. | |
| 2015/0285997 A1* | 10/2015 | Pan | G02B 6/1228 385/28 |
| 2016/0266312 A1* | 9/2016 | Demaray | C23C 14/083 |
| 2017/0017034 A1* | 1/2017 | Painchaud | G02B 6/00 |
| 2017/0160468 A1* | 6/2017 | Yanagisawa | G02B 6/132 |
| 2017/0371102 A1* | 12/2017 | Painchaud | G02B 6/305 |
| 2018/0045886 A1* | 2/2018 | Demaray | G02B 6/305 |
| 2018/0172909 A1* | 6/2018 | Asghari | G02B 6/305 |
| 2018/0275341 A1* | 9/2018 | Demaray | G02B 6/132 |
| 2018/0364416 A1* | 12/2018 | Li | G02B 6/14 |

OTHER PUBLICATIONS

Junqiu Liu, Arslan S. Raja, Martin H. P. Pfeiffer, Clemens Herkommer, Hairun Guo, Michael Zervas, Michael Geiselmann, and Tobias J. Kippenberg, "Double inverse nanotapers for efficient light coupling to integrated photonic devices," Opt. Lett. 43, 3200-3203 (2018) (Year: 2018).*
Hyundai Park, Sanggi Kim, Jaegyu Park, Jiho Joo, and Gyungock Kim, "A fiber-to-chip coupler based on Si/SiON cascaded tapers for Si photonic chips," Opt. Express 21, 29313-29319 (2013) (Year: 2013).*
R. Petra et al., "HWCVD a-Si:H interlayer slope waveguide coupler for multilayer silicon photonics platform," 2017 IEEE 14th International Conference on Group IV Photonics (GFP), Berlin, Germany, 2017, pp. 47-48, doi: 10.1109/GROUP4.2017.8082189. (Year: 2017).*
I. Moerman, P. P. Van Daele and P. M. Demeester, "A review on fabrication technologies for the monolithic integration of tapers with III-V semiconductor devices," in IEEE Journal of Selected Topics in Quantum Electronics, vol. 3, No. 6, pp. 1308-1320, Dec. 1997, doi: 10.1109/2944.658785. (Year: 1997).*
GB Examination Report for Application No. GB1905698.5 dated Sep. 22, 2020, 5 pages.
Search Report from UK IPO, Application No. GB1905698.5, dated Oct. 25, 2019, 3 pages.
International Search Report and Written Opinion, International Application No. PCT/EP2020/061483, European International Searching Authority, dated Jul. 13, 2020, 12 pages.
International Preliminary Report on Patentability, International Application No. PCT/EP2020/061483, International Searching Authority, dated Sep. 28, 2021, 7 pages.
Chun-Wei Liao, et al: "Fiber-Core-Matched Three-Dimensional Adiabatic Tapered Couplers for Integrated Photonic Devices", Journal of Lightwave Technology, IEEE, vol. 29, No. 5, Mar. 2011, 5 pages.
Snyder, Bradley, et al: "Packaging and Assembly Challenges for 50G Silicon Photonics Interposers." 2018 Optical Fiber Communications Conference and Exposition (OFC). IEEE, 2018.
Ku, Kai-Ning, and Ming-Chang M. Lee: "Cascade of two opposite tapers for butt-coupling between fibers and silicon photonic wires with large misalignment tolerance and low polarization dependency." Optical Fiber Communication Conference and Exposition and the National Fiber Optic Engineers Conference (OFC/NFOEC), 2013. IEEE, 2013.
Shoji, T., et al: "Low loss mode size converter from 0.3 μm square Si wire waveguides to single-mode fibers." Electronics Letters 38.25 (2002): 1669-1670.
Choo, Hyuck, et al: "Nano-focusing in a metal-insulator-metal gap plasmon waveguide with a three-dimensional linear taper." Nature Photonics 6.12 (2012): 838.
Fang, Qing, et al: "Low loss fiber-to-waveguide converter with a 3-D functional taper for silicon photonics." IEEE Photonics Technology Letters 28.22 (2016): 2533-2536.
Fang, Na, et al: "Three-dimensional tapered spot-size converter based on (111) silicon-on-insulator." IEEE Photonics Technology Letters 21.12 (2009): 820-822.
Yang, Zhifeng, et al: "Fabrication and characterization of integrated three-dimensional linear taper on silicon-on-insulator." Optical Engineering 48.3 (2009): 030503.
Li, Ling-Han, et al: "Monolithically integrated low-loss three-dimensional spot-size converter and silicon photonic waveguides (56) References Cited

OTHER PUBLICATIONS constructed by nano-tuned Bosch process and oxidation." Journal of Micro/Nanolithography, MEMS, and MOEMS 10.2 (2011): 023002.
Fritze, M., et al: "Fabrication of three-dimensional mode converters for silicon-based integrated optics." Journal of Vacuum Science & Technology B: Microelectronics and Nanometer Structures Processing, Measurement, and Phenomena 21.6 (2003): 2897-2902.
Holly, Roman, et al: "Fabrication of silicon 3D taper structures for optical fiber to chip interface." Microelectronic engineering84.5-8 (2007): 1248-1251.
I Day, I Evans, A Knights et al: "Tapered silicon waveguides for low-insertion-loss highly efficient high-speed electronic variable attenuators", in IEEE OFC 2003.
Cheben P et al: "Subwavelength waveguide grating for mode conversion and light coupling in integrated optics" Optics Express v14. n11, p. 4695-4702.
Gupta, Ramesh K., and Bijoy K. Das: "Multi-input and multi-output soi (MIMO-SOI) platform for silicon photonics." CSI transactions on ICT 5.2 (2017): 189-193.
Choudhury, Anm Masum, et al: "Method of improving light coupling efficiency between optical fibers and silicon waveguides." IEEE photonics technology letters 17.9 (2005): 1881-1883.
Simon Groblacher et al: "Highly efficient coupling from an optical fiber to a nanoscale silicon optomechanical cavity" Applied Physics Letters, 103, 181104, 2013.
Saeed Khan et al: "Low-loss, high-bandwidth fiber-to-chip coupling using capped adiabatic tapered fibers" National Institute of Standards and Technology, 2020.
Oscar A. Jimenez Gordillo et al: "Bridging Between Si and Few-Mode Fiber Higher Order Modes" Department of Electrical Engineering, 2020.
L. Chen et al: 3D Vertical Coupler Array for 4-Way Multi-Core Fiber-To-Chip Coupling by Two-Photon Lithography, State Key Laboratory of Optoelectronic Materials and Technologies, 2020.
R. Kou et al: "III-V/Si Adiabatic-Crossing Taper Structure Designed for u-Transfer Printing" 2020.
M-J Picard et al: "CMOS-compatible spot-size converter for optical fiber to sub-um silicon waveguide coupling with low-loss low-wavelength dependence and high tolerance to misalignment" SPIE 2016.
K. Kasaya et al: "A Simple Laterally Tapered Waveguide for Low-Loss Coupling to Single-Mode Fibers" IEEE Photonics Technology Letters, vol. 5, No. 3 1993.
Y. Maegami et al: "Completely CMOS compatible SiN-waveguide-based fiber coupling structure for Si wire waveguides" Optics Express vol. 24, No. 15 2016.
E. F. Perez at al: "Robust and automated direct on-axis laser writing of coupling elements for photonic chips" Dept of Physics 2019.
J. V. Galan et al: "Polarization insensitive low-loss coupling technique between SOI waveguides and high mode field diameter single-mode fibers" Optical Society of America 2007.
Qing Fang et al: "Suspended optical fiber-to-waveguide mode size converter for Silicon photonics" Optical Society of America 2010.
Pavel Cheben et al: "Broadband polarization independent nanophotonic coupler for silicon waveguides with ultra-high efficiency" Optical Society of America 2015.
Jhaozhi Luo et al: "Low-loss and broadband fiber-to-chip coupler by 3D fabrication on a silicon photonic platform" Optics Letters, vol. 45, No. 5 2020.
T. G. Tiecke et al: "Efficient fiber-optical interface for nanophotonic devices" Optica 2015.
Weifeng Jiang & B.M. Azizur Rahman: "Phase-matched multi-layer-based polarization-independent spot-size converter for silicon nanowire" Nature 2019.
EP Examination Report—Communication pursuant to Article 94(3) EPC, Application No. 20721567.4, European Patent Office, mailed on May 2, 2024, 5 pages.
1st Office Action, Chinese Application No. 202080031337.2, CNIPA Patent Office, dated Jan. 2, 2024, English Translation, 15 pages.
NPL: Yanagawa, et al., "Index and Dimensional Taper and Its Application to Photonic Devices", Journal of Lightwave Technology, vol. 10, No. 5, May 1992, 6 pages.

\* cited by examiner

PHOTONIC CHIP AND METHOD OF MANUFACTURE

RELATED APPLICATIONS

This application is a 35 U.S.C. § 371 national phase application of PCT/EP2020/061483 (WO-2020/216917-A1), filed on Apr. 24, 2020, entitled "PHOTONIC CHIP AND METHOD OF MANUFACTURE," which application claims the benefit of GB Patent Application No. 1905698.5, filed Apr. 24, 2019, each of which are incorporated herein by reference in entirety.

FIELD OF THE INVENTION

The present invention relates to photonic chips and to the coupling of components of different heights in a silicon photonic chip.

BACKGROUND

In the field of photonic chips, it is often necessary to optically couple waveguides of differing sizes or to couple waveguides to other optical components, such as fibres.

Tapered waveguides such as those shown in Liao, Chun-Wei, et al. "Fiber-core-matched three-dimensional adiabatic tapered couplers for integrated photonic devices." Journal of Lightwave Technology 29.5 (2011): 770-774 have been used to this effect. In this document, one end of the taper is coupled to a large component and the opposite end of the taper is coupled to a smaller component. The width and height of the 3-D taper gradually decreases from the end coupled to the large component to the end coupled to the small component. Using the 3-D taper, loss resulting from the interface between the large and small components can be reduced.

However, such chips can be difficult to subsequently process, for example using chemical mechanical polishing (CMP) due to the change in the top surface height across the chip.

The present invention has been devised in light of the above considerations.

SUMMARY OF THE INVENTION

In a first aspect, the present invention provides a photonic chip comprising: a silicon substrate, a low refractive index layer above the silicon substrate, and a tapered waveguide above the low refractive index layer, the tapered waveguide having a first height at a first end of the tapered waveguide and a second height at a second end of the tapered waveguide, the second height being greater than the first height, and the tapered waveguide having a bottom surface that is closer to the substrate at the second end than at the first end.

In this application, low refractive index means that the refractive index is lower than that of the tapered waveguide. For example, if the waveguide is formed of silicon, a low refractive index would be a refractive index of less that the refractive index of silicon. For, example, a low refractive index may be less than 3.4 at a wavelength of 1200-8500 nm. By having a low refractive index, the low refractive index layer can confine light to the waveguide.

Alternatively or additionally, any low refractive index layer in this application may be an insulting layer. Further, where the term insulating layer is used in this application, such a layer may alternatively or additionally be a low refractive index layer.

As the bottom surface of the taper is closer to the substrate at the second end than the first end, the taper shape of the waveguide is, at least partially, buried in the chip. This enables the top surface of the taper to have a smaller, or no, inclination with respect to a top surface of other waveguides or a device layer on the chip and so enables easier processing of the chip.

Light may pass through the tapered waveguide from a large component (e.g. waveguide or fibre) to a smaller component (e.g. waveguide) by passing from the large component, through the tapered waveguide from the second end to the first end and then into the smaller component, or light may pass through the tapered waveguide from a small component to a larger component by passing from the small component, through the tapered waveguide from the first end to the second end and then into the large component. By passing through the tapered waveguide, the optical loss between the small and large components is reduced.

The height of a layer or a waveguide is measured in a direction away from the substrate. A top surface of a layer or a waveguide is the surface that is farthest from the substrate and a bottom surface of a layer or waveguide is the surface that is closest to the substrate. For example, a height of the tapered waveguide is measured from the bottom surface of the tapered waveguide to a top surface of the tapered waveguide in a direction normal to the surface of the substrate. A width of a waveguide is measured in a direction perpendicular to the height and perpendicular to the direction of propagation of light along the waveguide. A length of a waveguide is measured in a direction perpendicular to the height and parallel to the direction of propagation of light along the waveguide.

The first height may be less than 550 nm, preferably between 100 nm and 500 nm and more preferably is 220 nm. The second height may be between 1 and 10 microns, preferably between 2 and 5 microns and more preferably is 3 microns. The length of the tapered waveguide may be 30 micron to 1 mm, or preferably, between 50 micron+/−10 micron.

The width, and/or the height, of the trench may be varied continuously from the first end to the second end of the tapered waveguide to give a smooth change in width and/or height along the length of the tapered waveguide. Alternatively, the width and/or height of the tapered waveguide may be varied in steps along the length of the tapered waveguide. The steps may be at regular intervals along the length of the tapered waveguide.

The tapered waveguide may be formed of silicon.

A width of the tapered waveguide at the second end may be greater than a width of the tapered waveguide at the first end. In this way both the height and the width change over a length of the taper to form a 3D taper so that components having differing heights and widths can be coupled more effectively with reduced loss. The width at the first end may be 250 nm to 3000, preferably 500 nm+/−100 nm. The width at the second end may be 1 to 10 microns, preferably 3 microns.

The photonic chip may further comprise a first waveguide optically coupled to the first end of the tapered waveguide, the first waveguide having a third height.

A top surface of the tapered waveguide may be coplanar with a top surface of the first waveguide. This enables simpler subsequent processing, for example by CMP, of the chip due to the coplanar top surfaces.

Alternatively, the top surfaces may not be coplanar. For example, a centre height of the tapered waveguide may be coplanar with the centre height of the first and/or second waveguide. The centre height of each waveguide being a height that is an equal distance from a bottom surface and a top surface of the respective waveguide. This can be beneficial when light is to be guided between the waveguides of different heights.

A height of a mode of the tapered waveguide may be coplanar with a height of a mode of the first and/or second waveguide. A height of a core of the tapered waveguide may be coplanar with a height of a core of the first and/or second waveguide. Where multiple modes are formed in the tapered waveguide, a height of one or more of these modes may be aligned with a height of a mode of the first and/or second waveguide.

In this disclosure, surfaces that differ in height by less than 50 nm are regarded as coplanar as the difference in height is negligible. Such height differences may be caused by manufacturing processes such as a CMP stop layer.

The photonic chip may further comprise a second waveguide optically coupled to the second end of the tapered waveguide, the second waveguide having a fourth height, the fourth height being greater than the third height. A top surface of the tapered waveguide may be coplanar with a top surface of the second waveguide.

A width of the second waveguide may be greater than a width of the first waveguide.

Optionally, a height of the second end may be 10 micron. The second end of the tapered waveguide may be coupled to a fibre and/or may be at an edge of the photonic chip. This may enable the second end to be coupled to a device that is not formed on the photonic chip.

The photonic chip may further comprise a top device layer above the low refractive index layer, an intermediate device layer beneath the low refractive index layer and a further low refractive index layer beneath the intermediate device layer. The photonic chip may be formed on a double silicon-on-insulator (SOI) substrate, the double SOI substrate having a top device layer formed of silicon; the low refractive index layer being beneath the top silicon device layer; the intermediate device layer being beneath the low refractive index layer and the intermediate device layer being formed of silicon; the further low refractive index layer being beneath the intermediate device layer; and the silicon substrate being beneath the further low refractive index layer.

The tapered waveguide may be contiguous with the top device layer at the first end of the tapered waveguide and/or may be contiguous with the intermediate device layer at the second end. The term contiguous means that the tapered waveguide meets a layer at a border and may be continuous with the layer (for example the tapered waveguide may form a single crystal with the layer) or may meet the layer at an interface where the internal structure of the waveguide and the layer are not aligned (for example, the waveguide may be amorphous silicon and the layer may be single crystal or the layer and the waveguide may be formed of different materials).

The tapered waveguide may be epitaxially grown. Alternatively, the tapered waveguide may be deposited by chemical vapour deposition (CVD), atomic layer deposition, evaporation or sputtering. The tapered waveguide may be deposited as poly-crystalline or amorphous material and then later thermally regrown to form a poly-crystalline or single crystal structure.

The tapered waveguide and/or the first waveguide, and/or the second waveguide may be formed of polycrystalline silicon, amorphous silicon or single crystal silicon. The tapered waveguide and/or the first waveguide, and/or the second waveguide may be formed of germanium, or silicon nitride, or oxynitride in any combination.

The tapered waveguide and/or the first waveguide, and/or the second waveguide may be strip, rib or slot shaped waveguides.

The tapered waveguide, first waveguide, and/or the second waveguide may be formed of a sequence of materials and the sequence may be periodic. For example, one or more of the waveguides may be formed of alternating segments of silicon oxide and silicon which may be adjusted in size to select the desired refractive index of the waveguide. The segments may be sized such that their length is less than the wavelength of the light to be passed through the waveguide.

In a second aspect, the present invention provides, a method of manufacturing a photonic chip, the method comprising: providing a wafer comprising a silicon substrate, and an low refractive index layer above the silicon substrate, etching the low refractive index layer to form a tapered trench having a first height at a first end of the tapered trench and a second height at a second end of the tapered trench, the second height being greater than the first height, and the tapered trench having a bottom surface that is closer to the substrate at the second end than at the first end, and forming a tapered waveguide in the tapered trench.

The trench may be etched using reactive ion etching.

The step of forming the tapered waveguide may comprise filling the tapered trench with polycrystalline silicon, amorphous silicon or single crystal silicon.

The step of forming the tapered waveguide may comprise epitaxially growing material in the tapered trench. Alternatively, the step of forming the tapered waveguide may comprise depositing material by chemical vapour deposition (CVD), atomic layer deposition, evaporation or sputtering. The tapered waveguide may be deposited as poly-crystalline or amorphous material and then later thermally regrown to form a poly-crystalline or single crystal structure. The material may be silicon.

The step of forming the tapered waveguide may comprise etching the material in the trench to form a rib, strip or slot waveguide.

The step of forming the tapered waveguide, first waveguide, and/or the second waveguide may comprise depositing or growing a sequence of materials over the length of the waveguide. The sequence may be periodic. For example, one or more of the waveguides may be formed of alternating segments of silicon oxide and silicon which may be adjusted in size to select the desired refractive index of the waveguide. The segments may be sized such that their length is less than the wavelength of the light to be passed through the waveguide. An example of a method for producing a waveguide with a sequence of materials is given in Cheben P et al. 2006 'Subwavelength waveguide grating for mode conversion and light coupling in integrated optics' Optics Express v14. n11, p 4695-4702.

The wafer may be a silicon-on-insulator wafer comprising the silicon substrate, the low refractive index layer and a silicon device layer.

The wafer may be a double silicon-on-insulator wafer comprising a top silicon device layer, the low refractive index layer beneath the top silicon device layer, an intermediate device layer beneath the low refractive index layer, a further low refractive index layer beneath the intermediate device layer and the substrate beneath the further low refractive index layer.

The invention includes the combination of the aspects and preferred features described except where such a combination is clearly impermissible or expressly avoided. In particular, the method of the second aspect may be adapted to form any of the optional features of the photonic chip of the first aspect.

SUMMARY OF THE FIGURES

Embodiments and experiments illustrating the principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
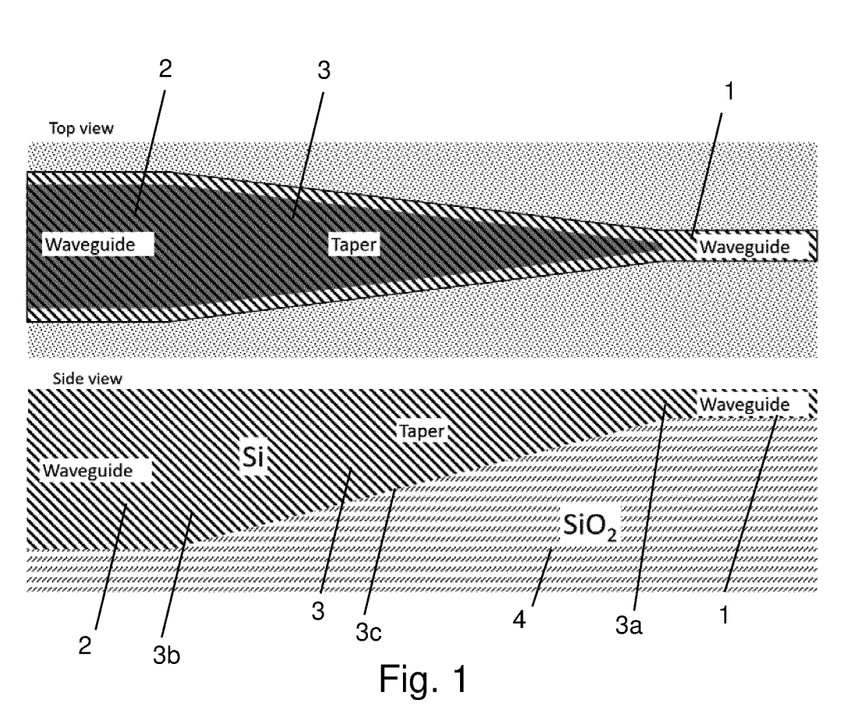
FIG. 1 shows a top view and a side, cross-sectional view of a portion of a photonic chip according to the present invention.

FIG. 1 shows a portion of a photonic chip in which a first waveguide 1 is coupled to a second waveguide 2 by a tapered waveguide 3. The tapered waveguide 3 meets the first waveguide 1 at a first end 3a of the tapered waveguide 3 and the tapered waveguide 3 meets the second waveguide 2 at the second end 3b of the tapered waveguide 3. At the first end 3a of the tapered waveguide, the height of the tapered waveguide is greater than the height at the second end 3b of the tapered waveguide. The width of the tapered waveguide 3 is greater at the second end 3b than at the first end 3a. The first waveguide 1 has a smaller height and a smaller width than the second waveguide 2.

As can be seen in the side view, the top surfaces of the first, second and tapered waveguides are coplanar. In other embodiments, the top surfaces may not be coplanar. For example, a centre height of the tapered waveguide may be coplanar with the centre height of the first and/or second waveguide. The centre height of each waveguide being a height that is an equal distance from a bottom surface and a top surface of the respective waveguide. This can be beneficial when light is to be guided between the waveguides of different heights.

A height of a mode of the tapered waveguide may be coplanar with a height of a mode of the first and/or second waveguide. A height of a core of the tapered waveguide may be coplanar with a height of a core of the first and/or second waveguide. Where multiple modes are formed in the tapered waveguide, a height of one or more of these modes may be aligned with a height of a mode of the first and/or second waveguide.

Figure 2:
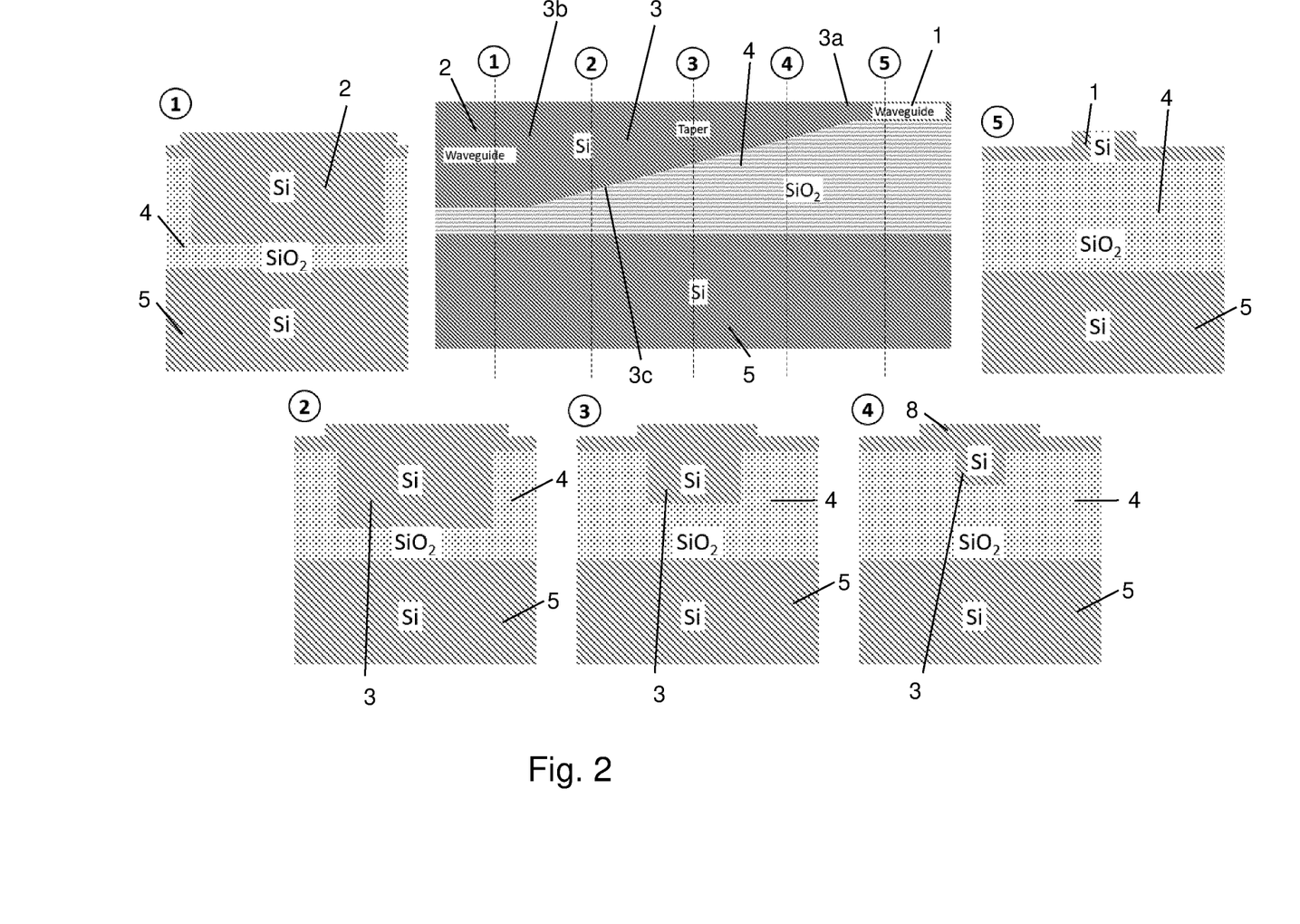
FIG. 2 shows a side, cross sectional view of a portion of the photonic chip of FIG. 1 (upper middle) along with cross-sectional views of the photonic chip along lines 1 to 5.

The photonic chip of FIG. 1 is shown in more detail in FIG. 2. The cut-through views show a cross-section across the width of the waveguides. View (1) shows a cut-through the second waveguide, views (2), (3) and (4) show positions along the length of the tapered waveguide and view (5) shows a cut through the first waveguide.

The photonic chip of FIGS. 1 and 2 can be formed on a SOI wafer having a substrate 5, an insulating layer 4 above the substrate and a silicon device layer 6 above the insulating layer 4. The first waveguide 1 is formed in the silicon device layer 6. The second waveguide 2 extends through the silicon device layer 6 and into a trench in the insulating layer 4.

The bottom surface 3c of the tapered waveguide is inclined with respect to the surface of the substrate 5 beneath the insulating layer 4 (not shown in FIG. 1). In this way, the taper is buried in the insulating layer 4.

In the embodiment shown, the insulating layer 4 is formed of $SiO_2$ and the waveguides and the substrate are formed of Si. Alternatively, the waveguides may be formed by another material such as germanium, silicon nitride or oxynitride.

In the embodiment shown in FIG. 2, the waveguides are rib waveguides. However, in other embodiments other types of waveguide could be used for the first waveguide, the second waveguide, the tapered waveguide or any combination of the waveguides. For example, strip or slot waveguides could be formed.

The tapered waveguide may be continuous with the first and/or second waveguide. For example, the tapered waveguide and one or both of the first and second waveguides may be formed of a single crystal structure.

Figure 3A:
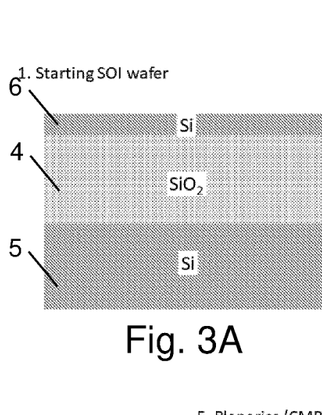
FIGS. 3A to G show cross-sectional views of steps in a method of manufacture of a photonic chip according to the present invention.

A method of manufacturing the photonic chip similar to the one shown in FIGS. 1 and 2 will now be described with reference to FIG. 3. FIG. 3A shows a SOI substrate with a substrate 5, an insulating layer 4 and a silicon device layer 6.

Figure 3B:
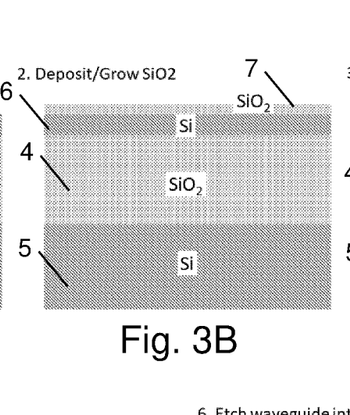

A layer of $SiO_2$ 7 is then deposited or grown on the silicon device layer 6 as shown in FIG. 3B.

Figure 3C:
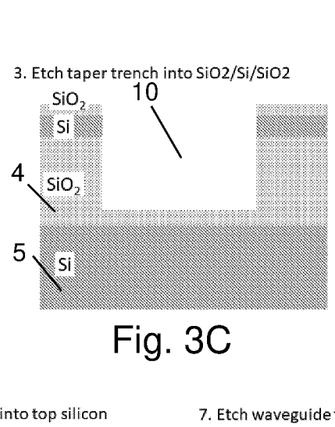

A trench 10 is then etched through the layer of $SiO_2$ 7, through the silicon device layer 6 and into the insulating layer 4. The trench 10 has a width at a first end of the trench 10 that is smaller than a width at a second end of the trench 10. The trench is etched using reactive ion etching (RIE). Due to a phenomenon called RIE lag, the wider the trench is, the deeper it is etched.

So, by controlling the width of the trench by the patterning of the layer of $SiO_2$ 7, the depth of the trench 10 can be controlled. This means that the height of the trench is greater at the second end of the trench, where the trench is widest, than at the height of the trench at the first end, where the trench is at its narrowest.

An example of a suitable etching process is inductively coupled plasma reactive ion etching. Here the additional electromagnetic inducted plasma enables high plasma densities and allows to control the degree of ionization of an argon and octafluorocyclobutane gas combination. The trench width depended etch depth can be controlled by exploiting the physical effect of RIE lag. This effect is mainly depended on the gas flow ratio of argon and octafluorocyclobutane. Here argon is used for controlling the degree of ionization and the density of the plasma and the level of anisotropic etching, where the Octafluorocyclobutane controls the degree of polymerization. In this example, the chamber pressure is low, the ICP power is several thousand watts and the RF power is in the range of hundreds of watts. These parameters allow to etch silicon dioxide with an etch rate between 1.5 nm/s to 6 nm/s. In one specific example around 2000 nm is etched into the silicon dioxide layer for a 3000 nm wide trench whilst the etch depth into the silicon dioxide layer for a 250 nm width trench is only 200 nm.

The width, and so the height, of the trench can be varied continuously from the first end to the second end to give a gradual change in height and width along the length of the trench, or the width, and so the height, of the trench can be varied in steps along the length of the trench.

Figure 3D:
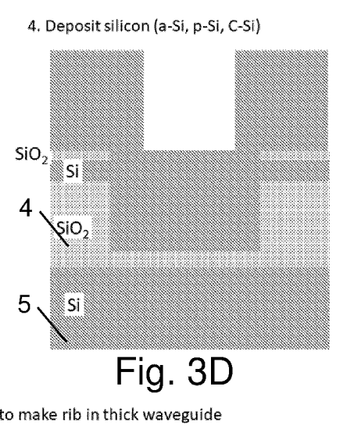

As shown in FIG. 3D, silicon is then deposited in the trench 10 to fill the trench. The silicon may be amorphous silicon (a-Si), polycrystalline silicon (p-Si) or single crystalline silicon (c-Si). Silicon may be deposited using LPCVD, PECVD, atomic layer deposition, sputtering, evaporation and/or epitaxial growth. More silicon may be deposited than is needed to fill the trench, so the trench may be overfilled as shown in FIG. 3D.

Figure 3E:
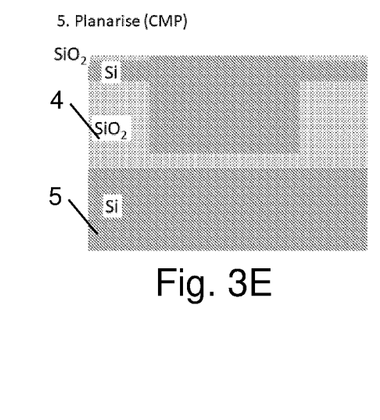

The top surface of the deposited silicon is then planarised, for example, using chemical mechanical polishing (CMP) as shown in FIG. 3E. The $SiO_2$ layer 7 acts as a stop layer for planarisation so that the top surface of the deposited silicon in the trench is substantially coplanar to the top surface of the silicon device layer 6.

Figure 3F:
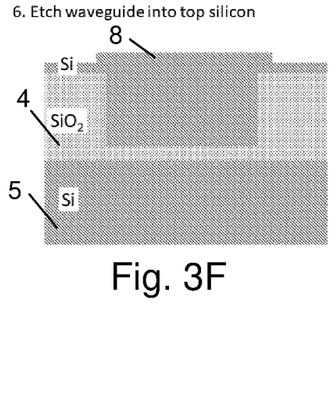

A waveguide 8 is then etched into the silicon device layer 6 in FIG. 3F to form the photonic chip of FIGS. 1 and 2. The waveguide 8 overlies the trench 10, and may be wider than the trench 10.

Figure 3G:
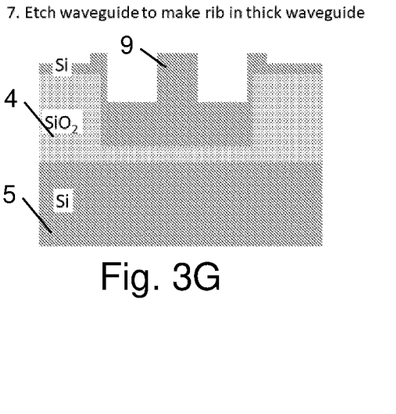

If the tapered waveguide is to be a rib waveguide, then the taper 3 is etched to form tapered waveguide 9 in the silicon deposited within the trench. Tapered waveguide 9 is formed so that its width at its first end, which is located at the first end of the trench, is smaller than the width of the tapered waveguide 9 at its second end which is located at the second end of the trench. As the trench is deeper at the second end than at the first end, the height of the tapered waveguide 9 is also smaller at the first end than at the second end. So, the tapered waveguide 9 has a 3D taper shape as both its height and width taper along the length of the tapered waveguide.

In this embodiment, waveguides 8 and 9 are rib waveguides, but in other embodiments, one or both of the waveguides 8, 9 may be another type of waveguide such as a strip or slot waveguide. The waveguides may also be formed of a sequence of materials as described above.

Tapered waveguide 9 may be coupled to a first waveguide at its first end, via the waveguide 8 formed in the silicon device layer. Waveguide 8 can help to keep light in the taper tightly confined laterally and feed into the narrower first waveguide.

Figure 4:
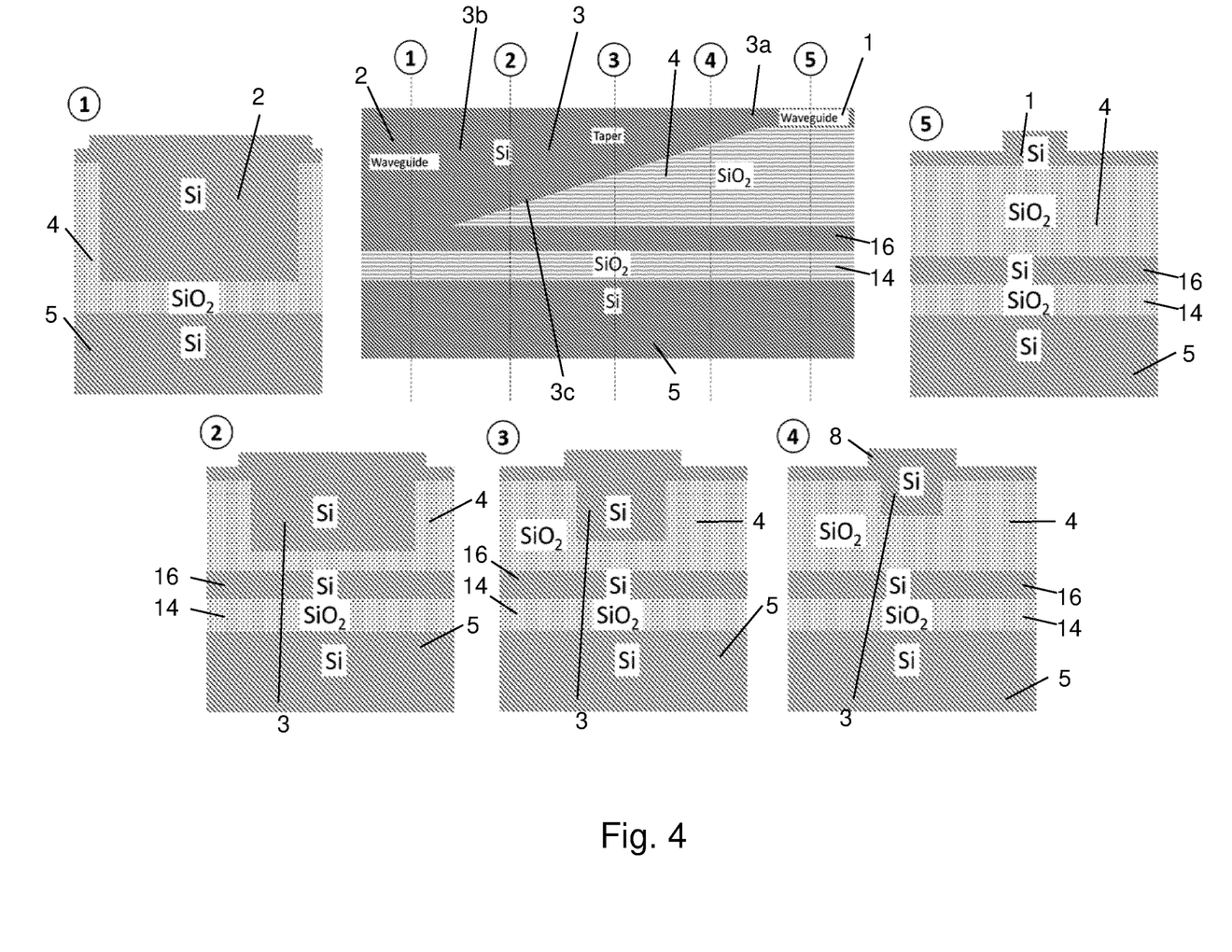
FIG. 4 shows a side, cross sectional view of a portion of a photonic chip according to the present invention (upper middle) along with cross-sectional views of the photonic chip along lines 1 to 5.

FIG. 4 shows another photonic chip having first, second and tapered waveguides. The cut-through views show a cross-section across the width of the waveguides. View (1) shows a cut-through the second waveguide, views (2), (3) and (4) show positions along the length of the tapered waveguide and view (5) shows a cut through the first waveguide.

The photonic chip of FIG. 4 is similar to that of FIG. 2, except that the chip also has an intermediate silicon device layer 16 and a further insulating layer 14. The further insulating layer 14 is above the substrate 5, the intermediate silicon device layer 16 is above the further insulating layer 14, the insulating layer 4 is above the intermediate silicon device layer 16 and the tapered waveguide 3 is above the insulating layer 4.

The first waveguide 1 is formed in the top silicon device layer 6. The second waveguide extends from the intermediate silicon device layer 16, past the insulating layer 4, and to the top silicon device layer 6. So, a bottom portion of the second waveguide is formed of the intermediate silicon device layer.

The first waveguide 1 is coupled to the second waveguide 2 by tapered waveguide 3. The tapered waveguide 3 meets the first waveguide 1 at a first end 3a of the tapered waveguide 3 and the tapered waveguide 3 meets the second waveguide 2 at the second end 3b of the tapered waveguide 3. The tapered waveguide meets the top silicon device layer 6 at the first end of the tapered waveguide and meets the intermediate silicon device layer 16 at the second end of the tapered waveguide.

At the first end 3a of the tapered waveguide, the height of the tapered waveguide is greater than the height at the second end 3b of the tapered waveguide. The width of the tapered waveguide 3 is greater at the second end 3b than at the first end 3a. The first waveguide 1 has a smaller height and a smaller width than the second waveguide 2. As can be seen in the side view, the top surfaces of the first, second and tapered waveguides are coplanar.

The photonic chip of FIG. 4 can be formed on a double SOI wafer having a top silicon device layer 6, an insulating layer 4 beneath the top silicon device layer, an intermediate silicon device layer 16 beneath the insulating layer, a further insulating layer 14 beneath the intermediate silicon device layer, and a silicon substrate 5 beneath the further insulating layer.

The bottom surface 3c of the tapered waveguide is inclined with respect to the surface of the substrate 5 beneath the insulating layer 4. In this way, the taper is buried in the insulating layer 4.

In the same way as the photonic chip shown in FIG. 2, the top surface, a centre height, a height of a core or a mode of the tapered waveguide may be coplanar with the respective height in the first and/or second waveguide.

In the embodiment shown, the insulating layer 4 is formed of $SiO_2$ and the waveguides and the substrate are formed of Si. Alternatively, the waveguides may be formed by another material such as germanium, silicon nitride or oxynitride.

In the embodiment shown in FIG. 4, the waveguide 8 is a rib waveguide and waveguide 3 is a strip waveguide. However, in other embodiments other types of waveguide could be used for the first waveguide, the second waveguide, the tapered waveguide or any combination of the waveguides. For example, strip or slot waveguides could be formed.

The tapered waveguide may be continuous with the first and/or second waveguide. For example, the tapered waveguide and one or both of the first and second waveguides may be formed of a single crystal structure.

The tapered waveguide of FIG. 4 may be formed in a similar way to the method described in reference to FIG. 3 and as further described below.

A layer of $SiO_2$ is deposited or grown on the top silicon device layer 6. A trench is then etched through the layer of $SiO_2$, through the top silicon device layer 6 and into the insulating layer 4.

The trench has a width at a first end of the trench 10 that is smaller than a width at a second end of the trench and is etched using RIE so that the height of the trench is greater at the second end of the trench, where the trench is widest, than at the height of the trench at the first end, where the trench is at its narrowest.

The trench at the second end extends all the way through the insulating layer 4 so that the trench reaches the intermediate silicon layer 16. In this way, the silicon deposited in the trench meets the intermediate silicon device layer 16 at the second end of the trench. So, when the waveguide is formed in the silicon deposited in the trench, the second end 3b of the tapered waveguide 3, corresponding to the second end of the trench, meets the intermediate silicon device layer 16

The width, and so the height, of the trench can be varied continuously from the first end to the second end to give a gradual change in height and width along the length of the trench, or the width, and so the height, of the trench can be varied in steps along the length of the trench.

Silicon is then deposited in the trench to fill the trench. The silicon may be amorphous silicon (a-Si), polycrystalline silicon (p-Si) or single crystalline silicon (c-Si). More silicon may be deposited than is needed to fill the trench, so the trench may be overfilled. Silicon may be deposited using LPCVD, PECVD, atomic layer deposition, sputtering, evaporation and/or epitaxial growth.

The top surface of the deposited silicon is then planarised, for example, using CMP. The $SiO_2$ layer acts as a stop layer for planarisation so that the top surface of the deposited silicon in the trench is substantially coplanar to the top surface of the silicon device layer 6.

A waveguide is then etched into the silicon device layer 6 to form the photonic chip of FIG. 4. The waveguide overlies the trench, but may be wider than the trench 10.

If the tapered waveguide is to be a rib waveguide, then the taper 3 is etched to form a tapered rib waveguide in the silicon deposited within the trench.

The tapered waveguide may be used to couple a first waveguide and a second waveguide, the first and second waveguides having different heights. An example of how waveguides of multiple heights could be formed starting from a double SOI substrate will now be described.

First a layer of $SiO_2$ is deposited on the top surface of the double SOI wafer to later act as a CMP stop layer. A mask is then deposited and patterned using lithography. The mask can be a resist layer or a hard mask material which has been patterned by etching through a resist layer. A trench is then formed in the double SOI wafer by etching the CMP stop layer, the top silicon device layer 6 and the insulating layer 14 to the top surface of the intermediate silicon device layer 16 to expose a seed layer that can be used for single crystal regrowth. In other embodiments, etching may continue into the intermediate silicon device layer 16 so that the trench extends into the intermediate silicon device layer 16. Dry etching, wet etching or a combination of both of these techniques may be used. The mask may then be removed or left in place for use in later steps of manufacture.

The seed layer may then be cleaned to prepare the surface for growth. Single crystal silicon may then be epitaxially grown from the seed layer at the bottom of the trench. The grown silicon may overfill the trench so that a top surface of the silicon grown in the trench is higher than the top surface of the top silicon device layer 6.

After silicon growth, a planarization process may be carried out on the top surface of the grown silicon. Preferably, this process reduces the height of the grown silicon to match the top surface of the top silicon device layer 6. An example of a suitable planarization process is CMP. Preferably, the top surface of the grown silicon and the top surface of the top silicon device layer would match exactly. However, after planarising, the top surface of the grown silicon may be slightly higher than the top surface of the top silicon device layer 6. This is because it is difficult to accurately control the height at which planarization stops.

In this embodiment, a stop layer which polishes slower than silicon is used. This means that polishing can be stopped within the height of the stop layer, ensuring that, after polishing, the top surface of the grown silicon is higher than the top surface of the top silicon device layer by no more than the thickness of the stop layer. The hard mask may be left in place after its use in the earlier etching step so that the hard mask can be used as the stop layer during planarising.

The difference in height between the top surface of the top silicon device layer 6 and the top surface of the grown silicon 18 after planarising may be approximately 10 to 30 nm which is small enough that the two surfaces can be considered coplanar. The height of the grown silicon may vary over its width due to dishing which may occur in planarising causing the centre of the grown silicon to have a lower top surface than the edges of the grown silicon. This introduces a further tolerance of 50 nm, more preferably, 30 nm, more preferably 10 nm. If the top surface of the grown silicon is 'dished' in this manner, it may still be considered to be coplanar with the top surface of the top silicon device layer 6.

In another embodiment, shown in FIG. 5, the method described above may be modified by starting from a SOI wafer (FIG. 5A) instead of a double SOI wafer. The insulating layer 14 of the SOI wafer forms the further insulating layer 14 discussed in the method above. The silicon device layer of the SOI wafer forms the intermediate silicon device layer 16 as discussed above. $SiO_2$ is grown or deposited on the silicon device layer 16 as shown in FIG. 5B to form the insulating layer 4 discussed above. A thin silicon layer may be grown on the silicon device layer 16 before depositing the $SiO_2$. The tapered trench is then etched into the insulating layer 4 as shown in FIG. 5C. Silicon is then grown or deposited in the tapered trench as shown in FIG. 5D. The silicon is then planarised, for example, using CMP as shown in FIG. 5E to form a top silicon device layer 6. A waveguide 8 may then be etched into the top silicon device layer 6 as shown in FIG. 5H.

Figure 5A:
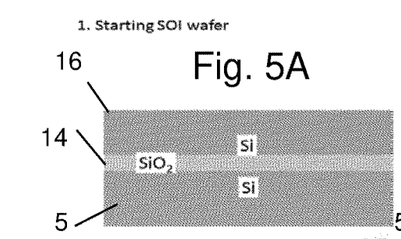
FIGS. 5A to H show cross-sectional views of steps in a method of manufacture of a photonic chip according to the present invention.
Figure 5B:
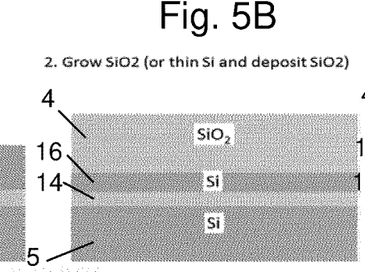
Figure 5C:
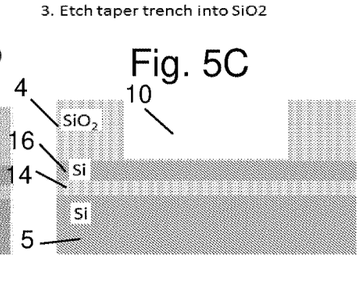
Figure 5D:
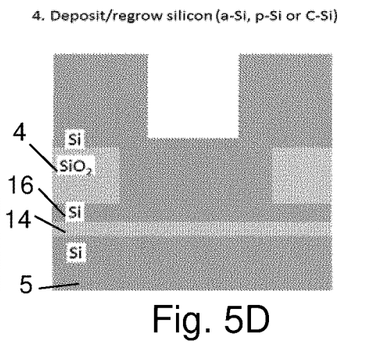
Figure 5E:
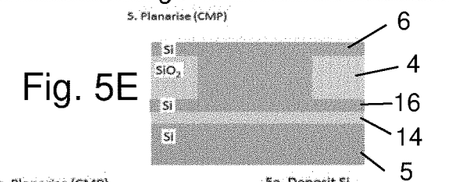
Figure 5F:
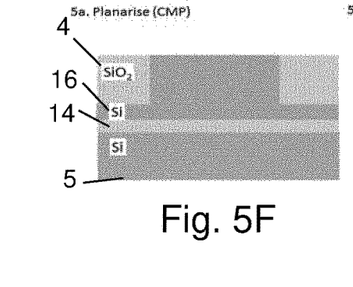
Figure 5G:
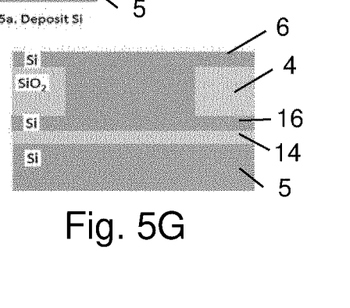
Figure 5H:
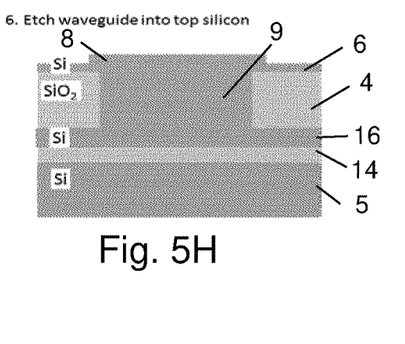

The planarising step may be split into two steps as shown in FIGS. 5F and 5G. In FIG. 5F, planarization is performed down to the top surface of the insulating layer 4, then silicon is deposited onto the top surface of the insulating layer and the filled tapered trench to form the silicon device layer 6.

The photonic chip can then be processed to produce waveguides of multiple heights, the waveguides having coplanar top surfaces.

For example, rib waveguides may be formed in the grown silicon and in the top silicon device layer 6, so that a first waveguide is formed in the top silicon device layer 6 and a second waveguide is formed in the grown silicon.

For example, the first waveguide can be formed by etching trenches in the top silicon device layer 6 from the top surface of the top silicon device layer to a height within the top silicon device layer 6. The silicon between the trenches forms the ridge of the rib waveguide and the silicon beneath the trenches forms the slab of the rib waveguide. The height of the first waveguide is equal to the height of the top silicon device layer 6, so the top surface of the first waveguide 22 is coplanar with the top surface of the top silicon device layer 6.

For example, the second waveguide can be formed by etching trenches in the grown silicon from the top surface of the grown silicon to the height of the top surface of the intermediate silicon device layer 16. The silicon between the trenches forms the ridge of the rib waveguide and the intermediate silicon device layer 16 beneath the trenches forms the slab of the rib waveguide. The height of the second waveguide is equal to the combined height of the intermediate silicon layer 16 and the planarised grown silicon. This is approximately equal to the combined height of the intermediate silicon layer 16, the insulating layer 14 and the top silicon device layer 6, so that the top surface of the first waveguide is coplanar with the top surface of the top silicon device layer 6. In a modification to this embodiment, the trenches may be deeper so that the slab has a smaller height than the intermediate silicon device layer 16, or the trenches may be shallower so that the slab has a larger height than the intermediate silicon device layer 16.

The tapered waveguides of the above examples can be used to couple two waveguides of different sizes. Alternatively, the second waveguide could be replaced by a device or a fibre optic cable and/or the first waveguide or the second waveguide may be replaced by a device such as a laser or modulator. For example, the tapered waveguide can be used as an edge coupler to couple a first waveguide on a photonic chip to a fibre optic cable.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A photonic chip comprising:
a silicon substrate,
a first low refractive index layer above the silicon substrate,
an intermediate device layer above the first low refractive index layer,
a second low refractive index layer above the intermediate device layer,
a top device layer above the second low refractive index layer, and
a tapered waveguide above the second low refractive index layer, the tapered waveguide having a first height at a first end of the tapered waveguide and a second height at a second end of the tapered waveguide, the second height being greater than the first height, and
the tapered waveguide having a bottom surface that is closer to the substrate at the second end than at the first end.

2. The photonic chip of claim 1, wherein the tapered waveguide is formed of silicon.

3. The photonic chip of claim 1 wherein a width of the tapered waveguide at the second end is greater than a width of the tapered waveguide at the first end.

4. The photonic chip of claim 1, further comprising a first waveguide optically coupled to the first end of the tapered waveguide, the first waveguide having a third height.

5. The photonic chip of claim 4, wherein a top surface of the tapered waveguide is coplanar with a top surface of the first waveguide.

6. The photonic chip of claim 4, further comprising a second waveguide optically coupled to the second end of the tapered waveguide, the second waveguide having a fourth height, the fourth height being greater than the third height.

7. The photonic chip of claim 6, wherein a top surface of the tapered waveguide is coplanar with a top surface of the second waveguide.

8. The photonic chip of claim 6, wherein a width of the second waveguide is greater than a width of the first waveguide.

9. The photonic chip of claim 1, wherein the tapered waveguide is contiguous with the top device layer at the first end of the tapered waveguide and is contiguous with the intermediate device layer at the second end.

10. The photonic chip of claim 1, wherein the tapered waveguide is epitaxially grown.

11. The photonic chip of claim 1, wherein the tapered waveguide is formed of polycrystalline silicon, amorphous silicon or single crystal silicon.

12. A method of manufacturing a photonic chip, the method comprising:
providing a double silicon-on-insulator wafer comprising a silicon substrate, a first low refractive index layer above the silicon substrate, an intermediate device layer above the first low refractive index layer, a second low refractive index layer above the intermediate device layer, and a top device layer above the second low refractive index layer,
etching the second low refractive index layer to form a tapered trench having a first height at a first end of the tapered trench and a second height at a second end of the tapered trench, the second height being greater than the first height, and
the tapered trench having a bottom surface that is closer to the substrate at the second end than at the first end, and
forming a tapered waveguide in the tapered trench.

13. The method of claim 12, wherein the tapered waveguide is formed of silicon.

14. The method of claim 12, wherein a width of the tapered trench at the second end is greater than a width of the tapered trench at the first end.

15. The method of claim 12, wherein the trench is etched using reactive ion etching.

16. The method of claim 12, wherein the photonic chip further comprises a first waveguide having a third height, wherein the first end of the tapered waveguide is optically coupled to the first waveguide.

17. The method of claim 16, wherein a top surface of the tapered waveguide is coplanar with a top surface of the first waveguide.

18. The method of claim 16, wherein the photonic chip further comprises a second waveguide having a fourth height, the fourth height being greater than the third height, and wherein the second end of the tapered waveguide is optically coupled to the second waveguide.

19. The method of claim 18, wherein a top surface of the tapered waveguide is coplanar with a top surface of the second waveguide.

20. The method of claim 18, wherein a width of the first waveguide is greater than a width of the second waveguide.

21. The method of claim 12, wherein the step of forming the tapered waveguide comprises filling the tapered trench with polycrystalline silicon, amorphous silicon or single crystal silicon.

22. The method of claim 12, wherein the step of forming the tapered waveguide comprises epitaxially growing silicon in the tapered trench.

23. The method of claim 12, wherein the step of forming the tapered waveguide comprises etching the silicon in the trench to form a rib waveguide.

24. The method of claim 12, wherein the wafer is a silicon-on-insulator wafer comprising the silicon substrate, the low refractive index layer and a silicon device layer.

25. The method of claim 12, wherein the tapered waveguide is contiguous with the intermediate device layer at the second end of the tapered waveguide and is contiguous with the top device layer at the first end.

* * * * *